United States Patent
Balasubramanian et al.

(10) Patent No.: US 9,348,562 B2
(45) Date of Patent: May 24, 2016

(54) CORRECTING NON-COMPLIANT SOURCE CODE IN AN INTEGRATED DEVELOPMENT ENVIRONMENT

(71) Applicant: International Business Machines Corporation, Armonk, NY (US)

(72) Inventors: Swaminathan Balasubramanian, Southfield, MI (US); Radha M. De, Kolkata (IN); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/467,320

(22) Filed: Aug. 25, 2014

(65) Prior Publication Data
US 2016/0054983 A1 Feb. 25, 2016

(51) Int. Cl.
*G06F 9/44* (2006.01)
*G06F 11/36* (2006.01)

(52) U.S. Cl.
CPC .............. *G06F 8/34* (2013.01); *G06F 11/3688* (2013.01)

(58) Field of Classification Search
CPC ... G06F 8/34; G06F 11/3688; G06F 11/1024; G06F 11/0793; H04L 63/0428
See application file for complete search history.

(56) References Cited

U.S. PATENT DOCUMENTS

| | | | |
|---|---|---|---|
| 6,381,506 B1* | 4/2002 | Grappone | 700/79 |
| 7,945,905 B2 | 5/2011 | Kumar et al. | |
| 2004/0003335 A1* | 1/2004 | Gertz et al. | 714/758 |
| 2004/0133777 A1* | 7/2004 | Kiriansky | G06F 21/554 713/166 |
| 2005/0060316 A1* | 3/2005 | Kamath et al. | 707/9 |
| 2005/0240419 A1* | 10/2005 | Collins et al. | 705/1 |
| 2007/0055656 A1* | 3/2007 | Tunstall-Pedoe | 707/3 |
| 2007/0282959 A1* | 12/2007 | Stern | 709/206 |
| 2007/0283325 A1* | 12/2007 | Kumar et al. | 717/122 |
| 2008/0148237 A1* | 6/2008 | Jiang et al. | 717/124 |
| 2008/0270989 A1* | 10/2008 | Ahadian et al. | 717/126 |
| 2009/0254538 A1* | 10/2009 | Arthurs | G06F 17/2288 |
| 2010/0050151 A1* | 2/2010 | Balasubramanian | 717/105 |
| 2011/0055799 A1* | 3/2011 | Kaulgud | G06F 11/3616 717/101 |
| 2011/0252394 A1 | 10/2011 | Sharma et al. | |
| 2013/0007704 A1 | 1/2013 | Haynes et al. | |
| 2014/0201363 A1* | 7/2014 | McAlister et al. | 709/224 |
| 2014/0237594 A1* | 8/2014 | Thakadu | G06F 21/52 726/23 |
| 2015/0135160 A1* | 5/2015 | Gauvin | H04W 4/001 717/109 |

* cited by examiner

*Primary Examiner* — Chameli Das
(74) *Attorney, Agent, or Firm* — Noah A. Sharkan; Maxine L. Barasch; Keohane & D'Alessandro PLLC (57) ABSTRACT

Approaches presented herein enable correction of source code that fails to comply with an established coding standard in a code base within an Integrated Development Environment (IDE). Specifically, a non-compliant segment of code, which requires correction, and that was coded by a first developer, is assembled into a stand-alone artifact that is dispatched to a second developer. The code segment is then corrected by the second developer, and the artifact containing the corrected segment is merged back into the code base from whence the segment originated. In one approach, the artifact comprises the code segment, dependent code classes of the segment, unit tests results, and test data. In another approach, the second developer is identified utilizing a skill-matching algorithm. In yet another approach, the corrected segment is unit-tested prior to being merged back into the code base.

17 Claims, 7 Drawing Sheets

```
Class CommentsService[
    . . .

①  WebSphere websphere = WebSphereFactory.getInstance();

②  WebSphere.setAppId(appId);
    WebSphere.setAccessToken(getToken()];
③  WebSphere.authenticate();

if (WebSphere.isAuthenticated) (
④      WebSphereUser user = WebSphere.getUser();
        String[] comments = commentsDatastore.getComments(user);
        / / --- continue to process comments ---
    )
    else{
        / / --- user not authenticated, switch to anonymous node ---
    )

FIG. 7 ant source code in an integrated development environment (IDE).

CORRECTING NON-COMPLIANT SOURCE CODE IN AN INTEGRATED DEVELOPMENT ENVIRONMENT

TECHNICAL FIELD

This invention relates generally to collaborative software development and, more specifically, to correcting non-compliant source code in an integrated development environment (IDE).

BACKGROUND

Most popular programming languages today use coding standards as a means of capturing and disseminating best practices. Coding standards often include a set of guidelines and/or recommended programming conventions for a given programming language. These standards usually cover file organization, indentation, comments, declarations, statements, naming standards, common patterns, programming practices, programming principles, programming rules of thumb, architectural best practices, etc. These guidelines can provide software structural quality. By writing consistent code, developers can help both themselves and, more importantly, other developers who may work in the same codebase. The coding standards may be formalized into a documented set of rules or an informal set of practices for a development group to follow. Formal coding standards can provide a top-down approach, often recommended and enforced long after program development is underway.

Within Integrated Development Environments (IDEs), modules are sometimes available that can automatically scan developed code and flag code segments that do not meet one or more coding standards. In one existing approach, the use of abstract syntax trees (ASTs) within IDEs has simplified the task of automating standards validation, as IDEs support both built in and third party validators. While such validators can detect and flag departures, there may be very limited ability to automatically correct them.

SUMMARY

In general, embodiments described herein provide correction of source code that does not comply with an established coding standard in a code base contained in an Integrated Development Environment (IDE). Specifically, a non-compliant segment of code, which requires correction, and that was coded by a first developer, is assembled into a stand-alone artifact that is dispatched to a second developer. The code segment is then corrected by the second developer, and the artifact containing the segment is merged back into the code base from whence the segment originated. In one approach, the artifact comprises the code segment, dependent code classes of the segment, unit tests results, and test data. In another approach, the second developer is identified utilizing a skill-matching algorithm. In yet another approach, the corrected segment is unit-tested prior to being merged back into the code base.

One aspect of the present invention includes a method for correcting non-compliant source code, the method comprising the computer-implemented steps of: identifying a coding violation within source code of an integrated development environment (IDE); forming an artifact by extracting a section of the source code containing the coding violation; providing the artifact to a developer for correction of the coding violation; and returning the artifact to the IDE following correction of the coding violation, the artifact including a segment of modified source code.

Another aspect of the present invention includes a system for correcting non-compliant source code, the computer system comprising: a memory medium comprising program instructions; a bus coupled to the memory medium; and a processor, for executing the program instructions, coupled to a source code correction engine via the bus that when executing the program instructions causes the system to: identify a coding violation within source code of an integrated development environment (IDE); form an artifact by extracting a section of the source code containing the coding violation; provide the artifact to a developer for correction of the coding violation; and return the artifact to the IDE following correction of the coding violation, the artifact including a segment of modified source code.

Yet another aspect of the present invention includes a computer program product for correcting non-compliant source code, the computer program product comprising a computer readable storage device, and program instructions stored on the computer readable storage device, to: identify a coding violation within source code of an integrated development environment (IDE); form an artifact by extracting a section of the source code containing the coding violation; provide the artifact to a developer for correction of the coding violation; and return the artifact to the IDE following correction of the coding violation, the artifact including a segment of modified source code.

A method for correcting non-compliant source code, comprising: providing a computer infrastructure operable to: identify a coding violation within source code of an integrated development environment (IDE); form an artifact by extracting a section of the source code containing the coding violation; provide the artifact to a developer for correction of the coding violation; and return the artifact to the IDE following correction of the coding violation, the artifact including a segment of modified source code.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to

DETAILED DESCRIPTION

Exemplary embodiments now will be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide correction of source code that does not comply with an established coding standard in a code base contained in an Integrated Development Environment (IDE). Specifically, a non-compliant segment of code, which requires correction, and that was coded by a first developer, is assembled into a stand-alone artifact that is dispatched to a second developer. The code segment is then corrected by the second developer, and the stand-alone artifact containing the segment is merged back into the code base from whence the segment originated. In one approach, the stand-alone artifact comprises the code segment, dependent code classes of the segment, unit tests results, and test data. In another approach, the second developer is identified utilizing a skill-matching algorithm. In yet another approach, the corrected segment is unit-tested prior to being merged back into the code base.

The approaches described herein contain numerous advantages over present methods including, but not limited to, automatic creation of a standalone artifact, which makes non-compliant code easily distributable to any location where skills are available, creation of coding/developer competitions for correcting the non-compliant code, automatic access by a second developer to repositories and infrastructure components, and automated replacement of fixed code, which allows for easy integration back into the existing code base.

Figure 1:
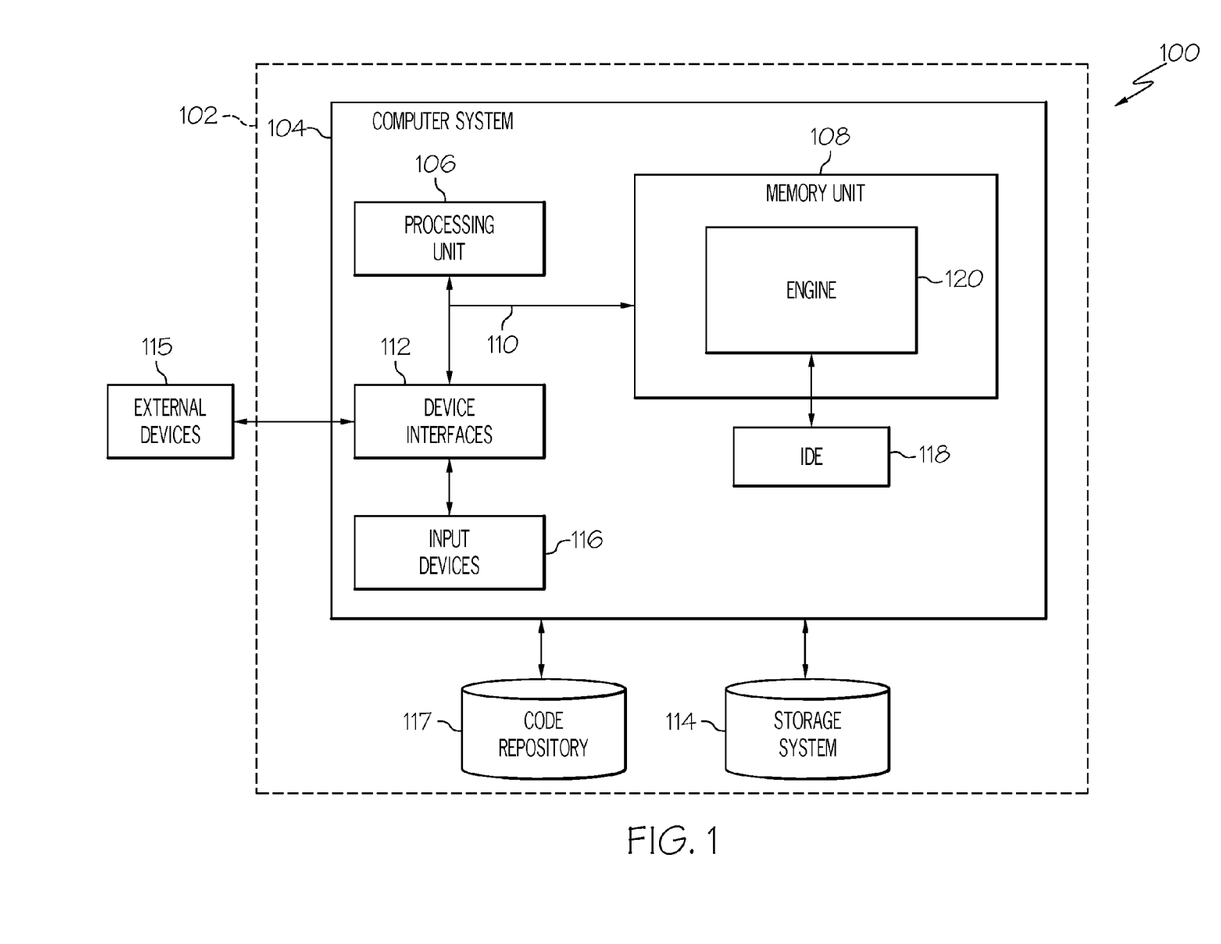
FIG. 1 shows an architecture in which the invention may be implemented according to illustrative embodiments.

Along these lines, as shown in FIG. 1, a computerized implementation 100 of an exemplary embodiment for correcting non-compliant source code in an IDE will be shown and described. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), a cloud-computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for correcting non-compliant code in an IDE. It should be understood that any other computers implemented under the present invention may have different components/software, but can perform similar functions. As shown, computer system 104 includes a processing unit 106 capable of communicating with a source code correction engine (engine) 120 stored in memory unit 108, a bus 110, and device interfaces 112. In general, engine 120 can be implemented as program/utility on computer system 104 and can enable the functions recited herein. As further shown, engine 120 (in one embodiment) comprises a rules and/or computational engine that processes a set (at least one) of rules/logic for correcting non-compliant source code. In general, engine 120 may be implemented as part of or in conjunction with IDE 118.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115, input devices 116, and IDE 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating engine 120, which is stored in memory 108 and/or storage system 114. While executing computer program code, processing unit 106 can read and/or write data to/from memory 108, storage system 114, code repository 117, and IDE 118. Storage system 114 and code repository 117 can include VCRs, DVRs, RAID arrays, USB hard drives, optical disk recorders, flash storage devices, and/or any other data processing and storage elements for storing and/or processing data.

As is commonly known, code repository 117 is a searchable, categorized, and/or Internet accessible location that users may access to browse, search, and download source or compiled library code. Uses of code repositories may include open source projects, proprietary development projects, and/or projects that create libraries for later use.

Figure 2:
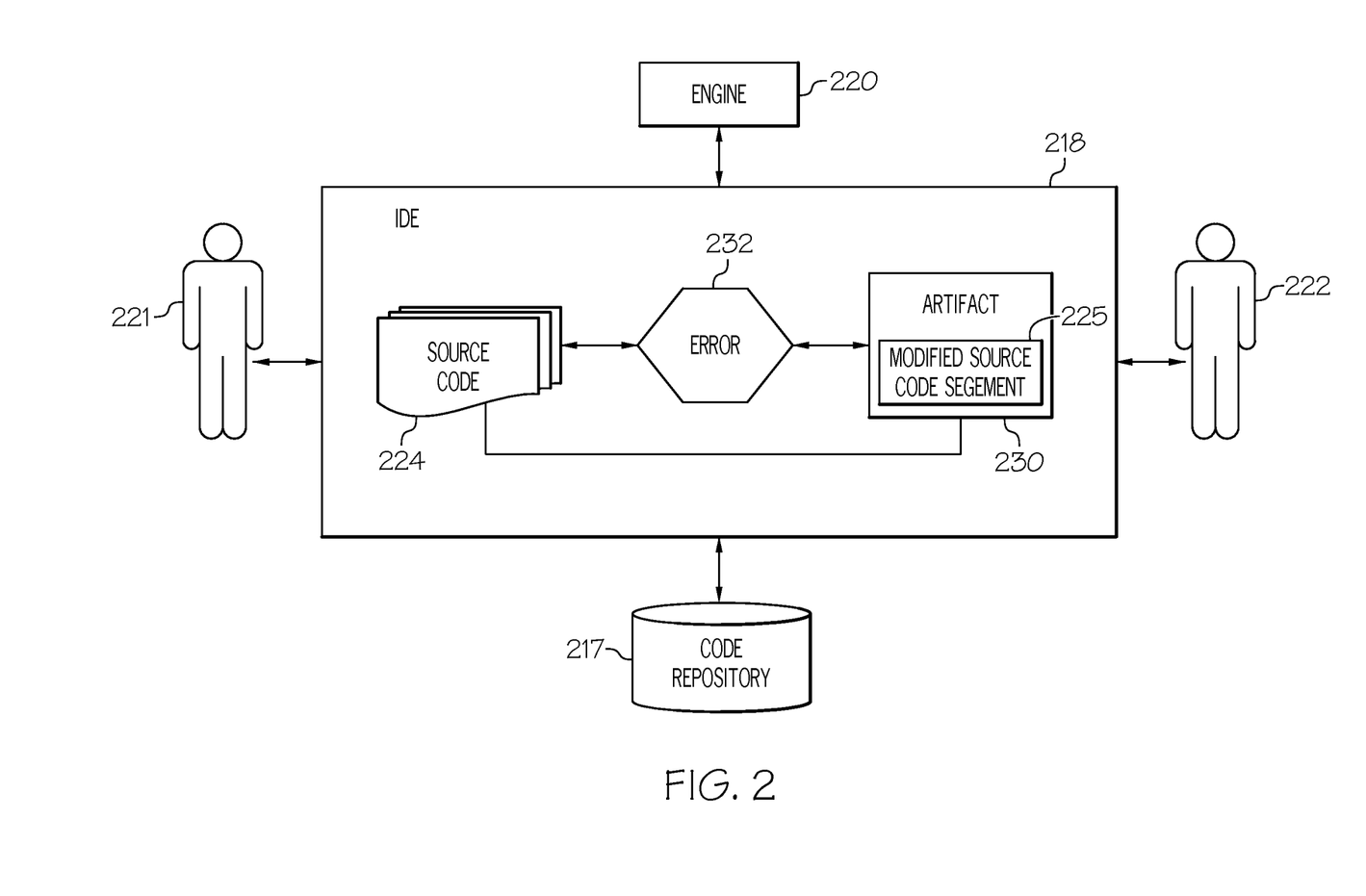
FIG. 2 shows a more detailed view of an IDE according to illustrative embodiments.

Referring now to FIG. 2, the structure and operation of engine 220 and IDE 218 will be described in greater detail. In an exemplary embodiment, IDE 218 represents a collaborative programming environment that that can be packaged as an application program, typically consisting of a code editor, a compiler, a debugger, and a graphical user interface (GUI) builder. IDE 218 may be a standalone application or may be included as part of one or more existing and compatible applications, and provides a user-friendly framework for many currently used programming languages.

As shown, multiple users, e.g., a first developer 221 and a second developer 222 have access to IDE 218. Although shown for simplicity as a single IDE, it will be assumed that first and second developers 221, 222 are each accessing his/her own instance of the IDE 218. In other words, first and second developers 221, 222 have a 'copy' of the IDE software installed on his/her computers, and second developer 222 simply imports an artifact 230 into his/her IDE, as will be further described herein.

In an exemplary embodiment, first developer 221 represents an initial programmer/creator of one or more portions of source code 224 within IDE 218, which may be retrieved from code repository 217. Second developer 222 represents another programmer/developer, who may be employed to receive artifact 230 that is formed by engine 220 based on a coding violation 232 for the purpose of correcting a portion of non-compliant code from source code 224, as will be described in greater detail herein.

Figure 3:
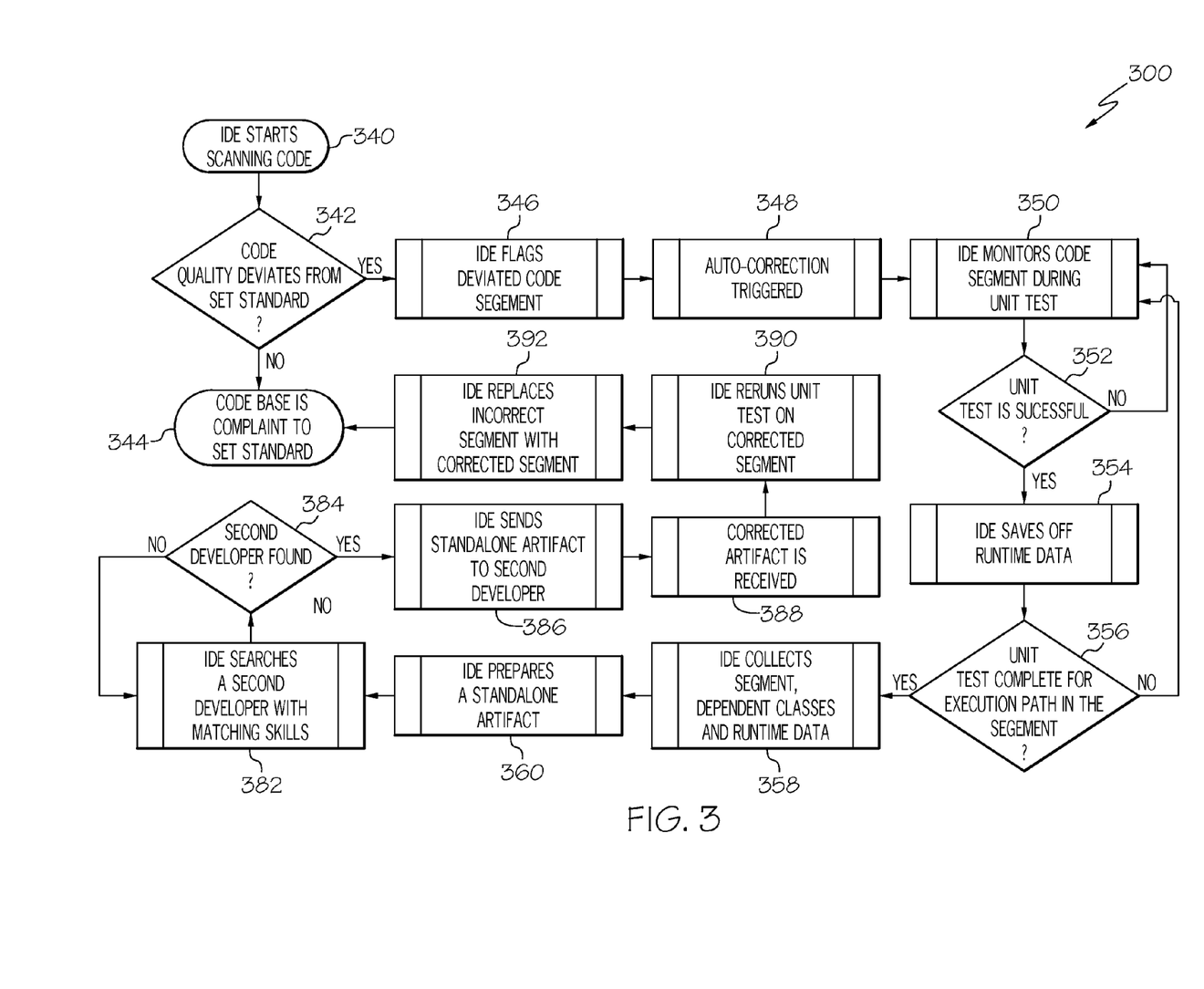
FIG. 3 shows an exemplary process flow for correcting non-compliant source code in the IDE according to illustrative embodiments.

Referring to FIGS. 2-3, an exemplary approach for detecting and correcting non-compliant source code in IDE 218 will be described in greater detail. As shown, process flow 300 of FIG. 3 begins at step 340, whereby IDE 218 starts scanning source code 224. At 342, it is determined whether source code 224 deviates from a set of coding standards. If no deviation exists, the code base is considered to be compliant to the set of coding standards (step 344). However, if a deviation does exist, coding violation (error) 232 within source code 224 is identified (i.e., "flagged") at 346. In the case of a simple violation/deviation, auto-correction of the violation is triggered at 348. For example, in the Java® language, violations such as demand imports (e.g., use of star when importing packages) or unused imports can be corrected automatically by IDE 218. However, other violations are more complex and typically not auto-correctable. These types of violations often require redesign of the code segment. Some examples of such violations include, but are not limited to, depth of nesting logic (e.g., if-else, for loop, etc.), class fan-out complexity (e.g., number of other classes a given class relies on), cyclomatic complexity (e.g., number of paths through the code), and NPath complexity (e.g., number of execution paths within a function).

In the case of such complex violations, engine 220 causes IDE 218 to query first developer 221 to see if he/she wishes to correct the violation via the help of another developer (e.g., second user 222). If first developer 221 indicates YES, IDE 218 triggers execution monitoring and testing on the flagged section of source code 224 containing coding violation 232. In other embodiments, IDE 218 may commence, without asking first developer 221, based on a preference with or without thresholds. For example, a preference may be to always commence execution monitoring. Alternatively, a preference may be to always commence execution monitoring if a specified number of days since an initial notification has elapsed, or if a specific project is flagged to always commence, which could be useful for time-sensitive projects.

For each code segment from source code 224 marked for execution monitoring and testing, engine 220 causes IDE 218 to begin monitoring the code segment when source code is tested using a series of unit test cases, as provided in step 350. This may be done automatically or, alternately, first developer 221 may notify IDE 221 when unit testing occurs. In one embodiment, while a code segment is under monitoring, IDE 218 may prevent any code changes in the segment. Or, if changes are allowed, IDE 218 may stop monitoring and trigger standards revalidation.

As used herein, the term "unit test case" is defined as a set of conditions and/or instances of variables relevant to modified code blocks such that the user can determine whether the subject code operates correctly and produces a result that the user had intended in modifying the subject code. A typical unit test case format in software engineering comprises, inter alia, a test case identifier, description, step number/order of run, prerequisite(s), depth, flag, etc. IBM WebSphere® Studio Asset Analyzer (WSAA) is an example of commercially available IT maintenance tool that provides automatic analysis as to dependencies within and among enterprise applications, including mainframe, Java®, and composite applications. (WebSphere is a registered trademark of International Business Machines Corporation in the United States and other countries; Java is a trademark or registered trademark of Oracle Inc. in the United States and other countries). In one embodiment of the present invention, the test case format employs JUnit model for Java programming language, as used by importing the JUnit test case class "org.junit.Test".

Next, it's determined at step 352 whether or not the unit test is successful. If YES, IDE 218 stores (step 354) some or all of the following information: runtime data before and after execution of the flagged code segment; the state of local, member, and dependent class variables; and associated extraneous data. In this context, extraneous data represents the input/output objects to the test case, and is an integral part of testing frameworks such as JUnit. In one example, if the function being tested is 'add(firstnumber, secondnumber)' and returns the 'result'; the data would be firstnumber, secondnumber and result.

Engine 220 causes IDE 218 to continue monitoring the code segment until every execution path is successfully unit tested, as provided in step 356. For example, if the flagged code segment contains conditional paths such as if-else, switch, etc., IDE 218 continues monitoring until every conditional path is covered.

When all paths are covered, engine 220 causes IDE 218 to trigger segment extraction in step 358, from which artifact 230 is formed (step 360). In an exemplary embodiment, artifact 230 is a stand-alone package of executable code and its associated dependencies. IDE 218 performs the extraction using the following steps.

1. Every class that the segment is dependent on is mocked. Preferably, only those methods in the class that the segment uses are mocked. Using data collected during the monitoring steps, a mock implementation of each method is created that returns the collected data when invoked.
2. Unit test cases related to the code segment are extracted into a separate executable test package.
3. If the code segment is a block of code instead of a method, the extraction converts the block into a method. All local variables before the block are added to the method signature. States of local and member variables at the end of the code segment execution become the return data. Unit tests are modified to test for these states.

Figure 4:
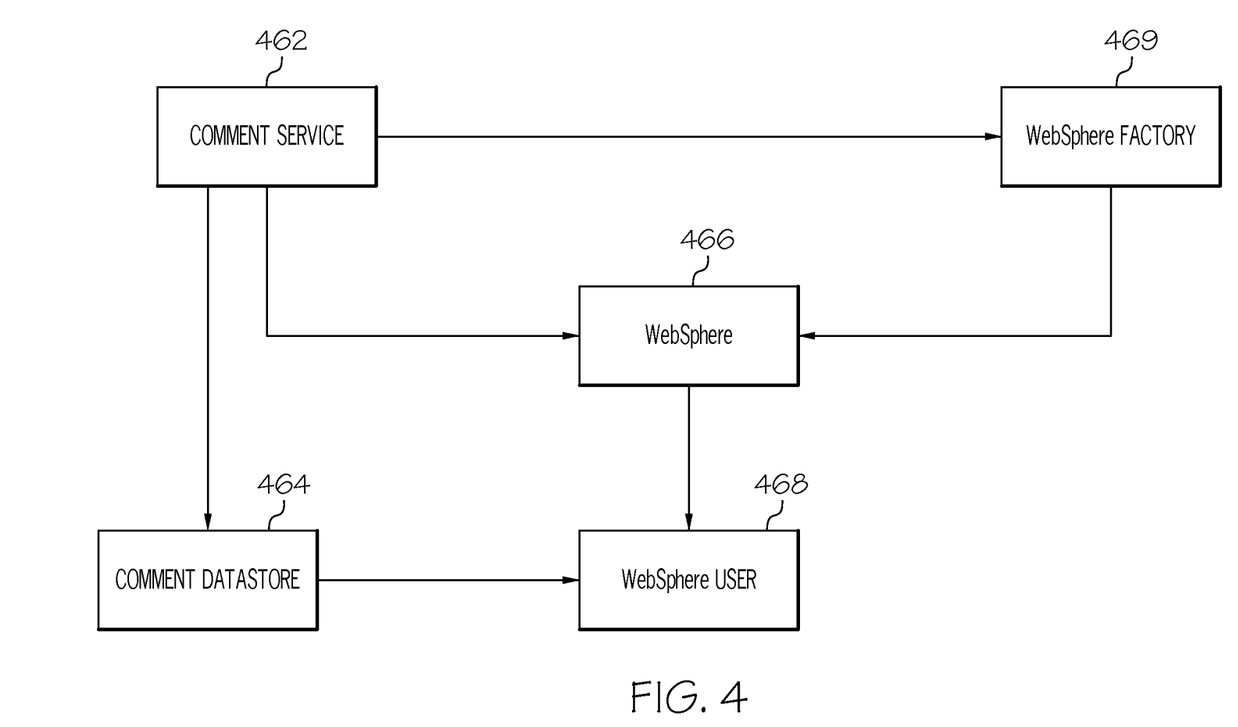
FIG. 4 shows an exemplary schematic of a simplified class diagram for an example service that stores comments entered by a user according to illustrative embodiments.
Figure 5:
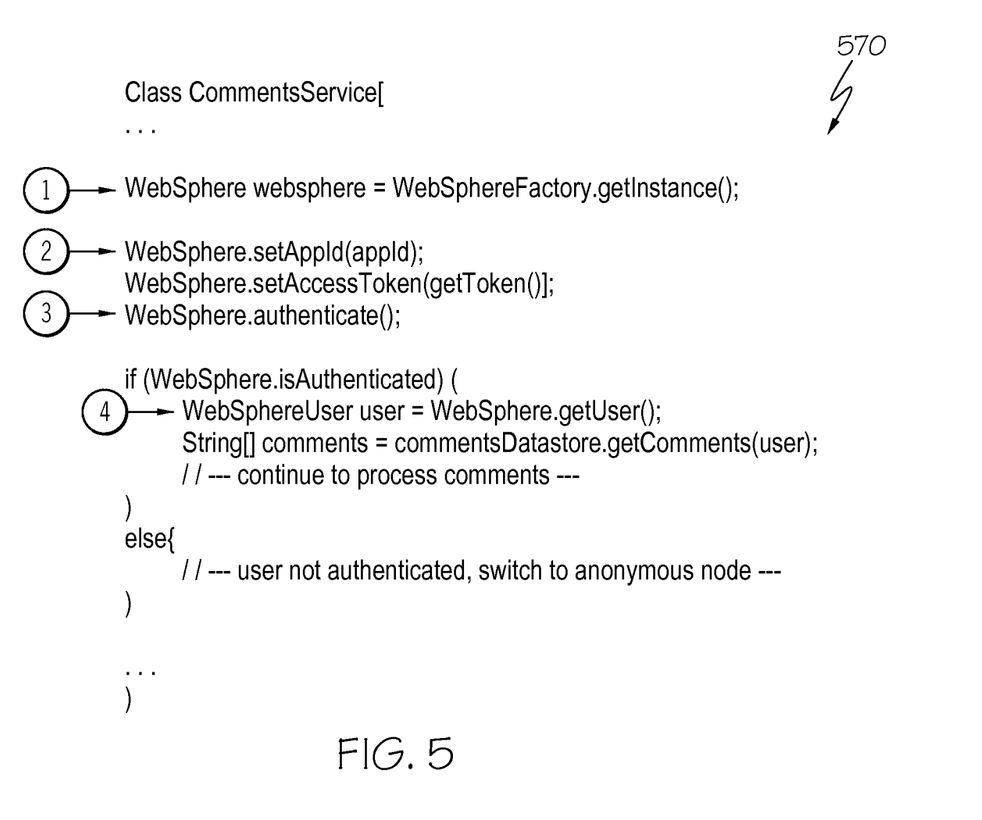
FIG. 5 shows an exemplary segment of code, which can be extracted into a stand-alone artifact, according to illustrative embodiments.
Figure 6:
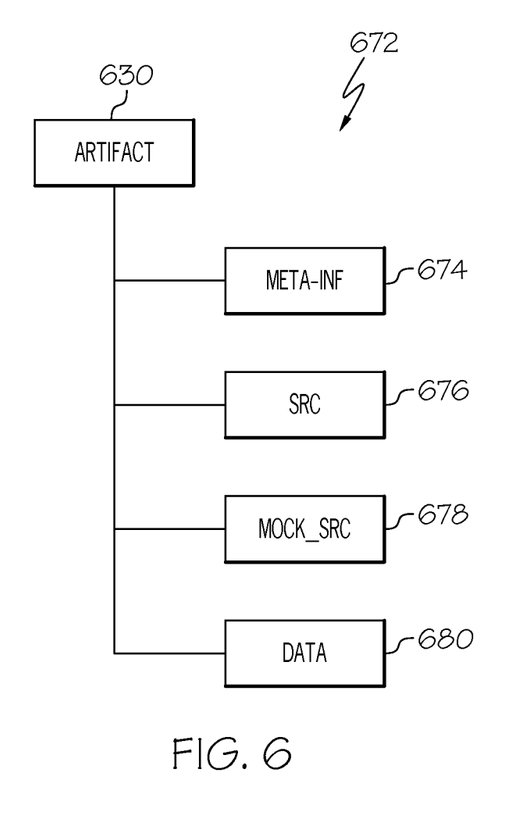
FIG. 6 shows an exemplary schematic of the extracted stand-alone artifact according to illustrative embodiments.

Extraction and formation of artifact 230 is further demonstrated by the example provided in FIGS. 4-6. As first shown in FIG. 4, an exemplary comments service 462 that stores comments entered by developers within a comments datastore 464 is provided, wherein the service uses application/website Websphere® 466 as an example for identifying the user 468 associated with a comment. (Websphere® is a trademark of International Business Machines Corporation in the United States and elsewhere.) Comments service 462 uses a Websphere factory 469 object to obtain an instance of the Websphere 466 class. Websphere user 468 object is associated with the Websphere 466 object. An instance of Comments Service 462 uses the Comments Datastore 464 object to persist comments associated with an instance of Websphere User 468.

As shown in FIG. 5, with reference as well to FIG. 4, a segment of code 570 is extracted into a stand-alone artifact. Within the segment extraction process, engine 220 causes IDE 218 (FIG. 2) to perform the following steps, which are denoted in FIG. 5 with reference numbers 1-4:
1. WebsphereFactory is mocked so that the getInstance() method returns a mock implementation of the Websphere class;
2. The 'appId' local variable and the return value of the getToken() method are added to the signature of the stand-alone method;
3. The Websphere.authenticate() and Websphere.isAuthenticated() methods are mocked to process authentication state based on the stored test data; and
4. Websphere.getUser() is mocked to return a mock implementation of the WebsphereUser class.

This results in an artifact having a structure 672, which is shown in FIG. 6. In this example, artifact 630 comprises META-INF component 674, which contains metadata associated with the extracted code segment that enables IDE 218 to perform automatic code replacement. For example, the metadata may represent a source compare between the original and extracted segment. Artifact 630 also comprises SRC component 676, which contains the extracted segment of code, and MOCK_SRC component 678, which contains any mock implementations of dependencies. Finally, artifact 630 comprises DATA component 680, which may contain any data captured during the execution monitoring step (element 350 of FIG. 3) that may be needed by the extracted segment of code.

Once the artifact is created, it is determined whether another developer exists for correcting the coding violation. Referring again to FIGS. 2-3, IDE 218 and engine 220 search a group of developers, according to a desired set of skills for correcting the coding violation (step 382), to identify second developer 222, as provided in step 384. In one embodiment, the search process may look for matching candidates within the same project, same company, or within social/formal networks. In another embodiment, IDE 218 may extract keywords from an error/violation description and use the keywords to search for matching skills. Alternately, IDE 218 may prompt first developer 221 to supply a list of requisite skills needed to fix the violation. Still further, IDE 218 may look at a change history from previous, similar violations and select a developer who contributed to the solution.

In one embodiment, if the search process finds no available matches, IDE 218 may convert the fix request into a problem that can be posted in one or more competition communities. Publication of the request can vary depending on the sensitivity or confidentiality of the source code, which may be assigned by first developer 221. For example, a high-confidentiality level indicates the code is part of a highly sensitive/protected engagement and, as such, the search may be limited to only those within the project or within the company, and to only those developers who meet certain security criteria. A medium-confidentiality level can indicate that the search is open to any developer within the company. Meanwhile, a low-confidentiality level can indicate that the search is more broad based and can be extended to social networks like LinkedIn® or Websphere®, or can be open to any competition community/environment. (LinkedIn® is a registered trademark of LinkedIn Corp. in the United States and elsewhere.)

Once second developer 222 is identified as having the requisite set of skills, IDE 218 sends artifact 230 from the segment extraction process to second developer 222, as provided in step 386. Second developer 222 then modifies source code 224 to correct coding violation 232, and returns artifact 230, containing a segment of modified source code 225, to IDE 218, as provided in step 388.

Next, as provided in step 390, IDE 218 tests modified source code segment 225 to determine if it complies with the set of coding standards. That is, IDE 218 reruns the unit test cases to confirm that modified source code segment 225 works as expected during a set of execution tests. If the unit tests fail, indicating that the set of standards is not met, artifact 230 is returned to second developer 222 with the test case report so that the issue can be addressed. In the case that the testing is successful, indicating that the set of standards is met, engine 220 causes IDE 218 to attempt in-place replacement of the existing code segment from source code 224 with modified source code segment 225, as provided in step 392. If replacement is successful, IDE 218 now contains a code base that is fully compliant with the set of standards (step 344). However, if replacement is unsuccessful, resulting in either compiling errors or test case failures when integrated, IDE 218 forwards updated/modified artifact 230 to first developer 221, whereby manual replacement can be done.

Once the change merge is processed, either automatically by engine 220 and IDE 218, or by first developer 221, complex code quality issues caused by coding violation 232 are eliminated. IDE 218 continues to scan source code 224 for any subsequent coding violations. If discovered, the process described herein for correcting the non-compliant source code in the IDE is again repeated.

It can be appreciated that the approaches disclosed herein can be used within a computer system to correct non-compliant source code in an IDE. In this case, as shown in FIG. 1, engine 120 can be provided, and one or more systems for performing the processes described in the invention can be obtained and deployed to computer infrastructure 102. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 7:
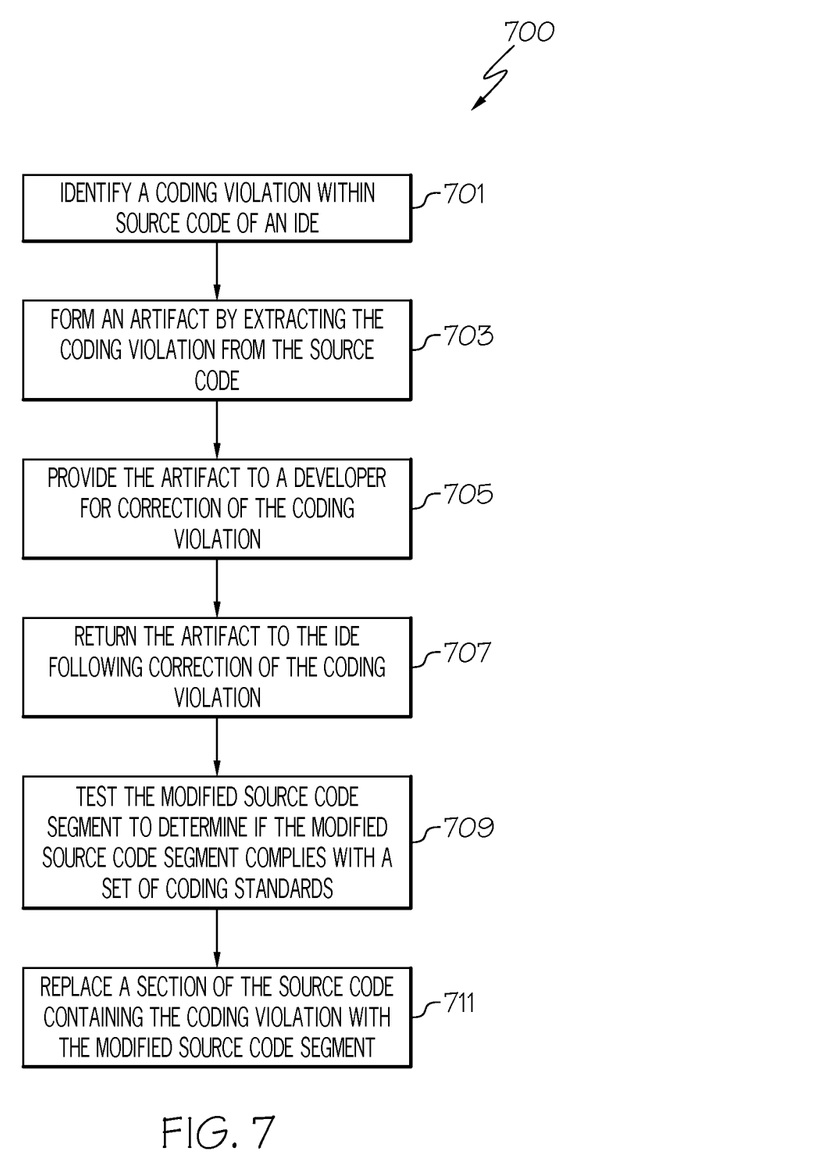
FIG. 7 shows an exemplary process flow for correcting non-compliant source code in the IDE according to illustrative embodiments.

As depicted in FIG. 7, a system (e.g., computer system 104) carries out the methodologies disclosed herein. Shown is a process flow 700 for correcting non-compliant source code in an IDE. At 701, a coding violation within source code of an IDE is identified. At 703, an artifact is formed by extracting a section of the source code containing the coding violation. At 705, the artifact is provided to a developer for correction of the coding violation. At 707, the artifact is returned to the IDE following correction of the coding violation, wherein the artifact includes a segment of modified source code. At 709, the modified segment of source code is tested. At 711, a section of the source code containing the coding violation is replaced with the segment of modified source code.

Process flow 700 of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, engine 120 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc. by a service provider that offers to deploy or integrate computing infrastructure with respect to a process for code testing and correcting non-compliant source code in an IDE. Thus, embodiments herein disclose a process for supporting computer infrastructure, comprising integrating, hosting, maintaining and deploying computer-readable code into a computing system (e.g., computer system 104), wherein the code in combination with the computing system is capable of performing the functions described herein.

In another embodiment, the invention provides a method that performs the process steps of the invention on a subscription, advertising and/or fee basis. That is, a service provider, such as a Solution Integrator, can offer to create, maintain, support, etc., a process for code testing and correcting non-compliant source code in the IDE. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches to correct non-compliant source code in an IDE. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for correcting non-compliant source code, the method comprising the steps of:
    identifying, by at least one computing device, a coding violation within source code of an integrated development environment (IDE);
    forming, by the at least one computing device, an artifact by extracting a section of the source code containing the coding violation from the source code;
    searching, using the IDE, based on keywords extracted from information pertaining to the coding violation, a first group of developers in attempt to identify a developer having a matching set of skills, for correcting the coding violation, the first group of developers being associated with a same company;
    when the developer is not identified by the search of the first group of developers,
        converting the information into a format configured for posting in a competition community,
        selecting a second group of developers from the competition community, the second group of developers having security credentials that match a confidentiality level corresponding to the information, publishing the information to the second group of developers;
identifying the developer from the second group of developers;
providing, by the at least one computing device, access to the artifact to the developer for correction of the coding violation;
receiving, by the at least one computing device, a correction of the coding violation from input by the developer; and
returning, by the at least one computing device, the artifact to the IDE following correction of the coding violation, the artifact including a segment of modified source code;
wherein all of the developers are human beings;
wherein the at least one computing device comprises at least one processor.

2. The method of claim 1, further comprising the step of testing, by the at least one computing device, the modified source code segment to determine if the modified source code segment complies with a set of coding standards and a set of execution tests.

3. The method of claim 2, further comprising the step of replacing, by the at least one computing device, the section of the source code containing the coding violation with the modified source code segment based on the testing.

4. The method according to claim 3, further comprising the steps of:
scanning, by the at least one computing device, the source code to identify the coding violation; and
flagging, by the at least one computing device, the section of the source code containing the coding violation.

5. The method according to claim 4, further comprising the step of testing, by the at least one computing device, the flagged section of the source code containing the coding violation using the set of execution tests.

6. The method according to claim 2, further comprising the step of re-sending, by the at least one computing device, the artifact to the developer in the case that the modified source code segment fails to comply with either of: the set of coding standards, and the set of execution tests.

7. A system for correcting non-compliant source code, comprising:
a memory medium comprising program instructions;
a bus coupled to the memory medium; and
a processor, for executing the program instructions, coupled to a source code correction engine via the bus that when executing the program instructions causes the system to:
identify a coding violation within source code of an integrated development environment (IDE);
form an artifact by extracting a section of the source code containing the coding violation;
search, using the IDE, based on keywords extracted from information pertaining to the coding violation, a first group of developers in attempt to identify a developer having a matching set of skills, for correcting the coding violation, the first group of developers being associated with a same company;
when the developer is not identified by the search of the first group of developers,
convert the information into a format configured for posting in a competition community,
select a second group of developers from the competition community, the second group of developers having security credentials that match a confidentiality level corresponding to the information, and
publish the to the second group of developers;
provide access to the artifact to] the developer for correction of the coding violation;
receive a correction of the coding violation from input by the developer;
return the artifact to the IDE following correction of the coding violation, the artifact including a segment of modified source code;
wherein the developer is a human being.

8. The system of claim 7, the program instructions further causing the system to test the modified source code segment to determine if the modified source code segment complies with a set of coding standards and a set of execution tests.

9. The system of claim 8, the program instructions further causing the system to replace the section of the source code containing the coding violation with the modified source code segment based on the testing.

10. The system according to claim 9, the program instructions further causing the system to:
scan the source code to identify the coding violation; and
flag the section of the source code containing the coding violation.

11. The system according to claim 10, the program instructions further causing the system to test the section of the flagged source code containing the coding violation using the set of execution tests.

12. The system according to claim 8, the program instructions further causing the system to re-send the artifact to the developer in the case that the modified source code segment fails to comply with either of: the set of coding standards, and the set of execution tests.

13. A computer program product for correcting non-compliant source code, the computer program product comprising a computer readable hardware storage device, and program instructions stored on the computer readable storage device, to:
identify a coding violation within source code of an integrated development environment (IDE);
form an artifact by extracting a section of the source code containing the coding violation;
search, using the IDE, based on keywords extracted from information pertaining to the coding violation, a first group of developers in attempt to identify a developer having a matching set of skills, for correcting the coding violation, the first group of developers being associated with a same company;
when the developer is not identified by the search of the first group of developers,
convert the information into a format configured for posting in a competition community,
select a second group of developers from the competition community, the second group of developers having security credentials that match a confidentiality level corresponding to the information, and
publish the information to the second group of developers;
provide access to the artifact to the developer for correction of the coding violation;
receive a correction of the coding violation from input by the developer; and
return the artifact to the IDE following correction of the coding violation, the artifact including a segment of modified source code;
wherein the developer is a human being.

14. The computer program product of claim 13, the computer readable hardware storage device further comprising program instructions to test the modified source code segment to determine if the modified source code segment complies with a set of coding standards and a set of execution tests.

15. The computer program product of claim 14, the computer readable hardware storage device further comprising program instructions to:
   replace the section of the source code containing the coding violation with the modified source code segment based on the testing; and
   re-send the artifact to the developer in the case that the modified source code segment fails to comply with either of: the set of coding standards, and the set of execution tests.

16. The computer program product according to claim 15, the computer readable hardware storage device further comprising program instructions to:
   scan the source code to identify the coding violation; and
   flag the section of the source code containing the coding violation.

17. The computer program product according to claim 16, the computer readable hardware storage device further comprising program instructions to test the section of the flagged source code containing the coding violation using the set of execution tests.

* * * * *